United States Patent [19]

Gaeddert et al.

[11] 4,016,712

[45] Apr. 12, 1977

[54] MACHINE FOR FORMING HIGH DENSITY ROUND BALES

[75] Inventors: Melvin Victor Gaeddert, Newton; Bobby Dwayne McWhirt, Hesston, both of Kans.

[73] Assignee: Hesston Corporation, Hesston, Kans.

[22] Filed: Feb. 25, 1976

[21] Appl. No.: 661,158

[52] U.S. Cl. .................................................. 56/341
[51] Int. Cl.$^2$ ......................................... A01D 39/00
[58] Field of Search ........................... 56/341–343, 56/1, DIG. 2; 100/5, 76, 78, 88

[56] References Cited

UNITED STATES PATENTS

| | | | |
|---|---|---|---|
| 3,534,537 | 10/1970 | Buchele et al. | 56/341 |
| 3,740,935 | 6/1973 | Gay | 56/16.4 |
| 3,788,052 | 1/1974 | Elwick | 56/341 |
| 3,815,345 | 6/1974 | Mast et al. | 56/341 |

Primary Examiner—Russell R. Kinsey
Attorney, Agent, or Firm—Schmidt, Johnson, Hovey & Williams

[57] ABSTRACT

The bale is formed by rolling it between an arcuate retaining grid at the front of the bale and an upwardly moving, flexible belt at the rear of the bale while continuously adding additional crop material to the forming chamber. The grid and the belts yield away from one another under substantial resistance during growth of the bale in order to compact the latter to the desired density. Because the grid and the belts share a common spring tensioning mechanism, compacting force is applied uniformly around the bale by those members throughout the forming process, thereby rendering the bale more truly circular in cross-sectional configuration and of more nearly uniform density throughout.

13 Claims, 4 Drawing Figures

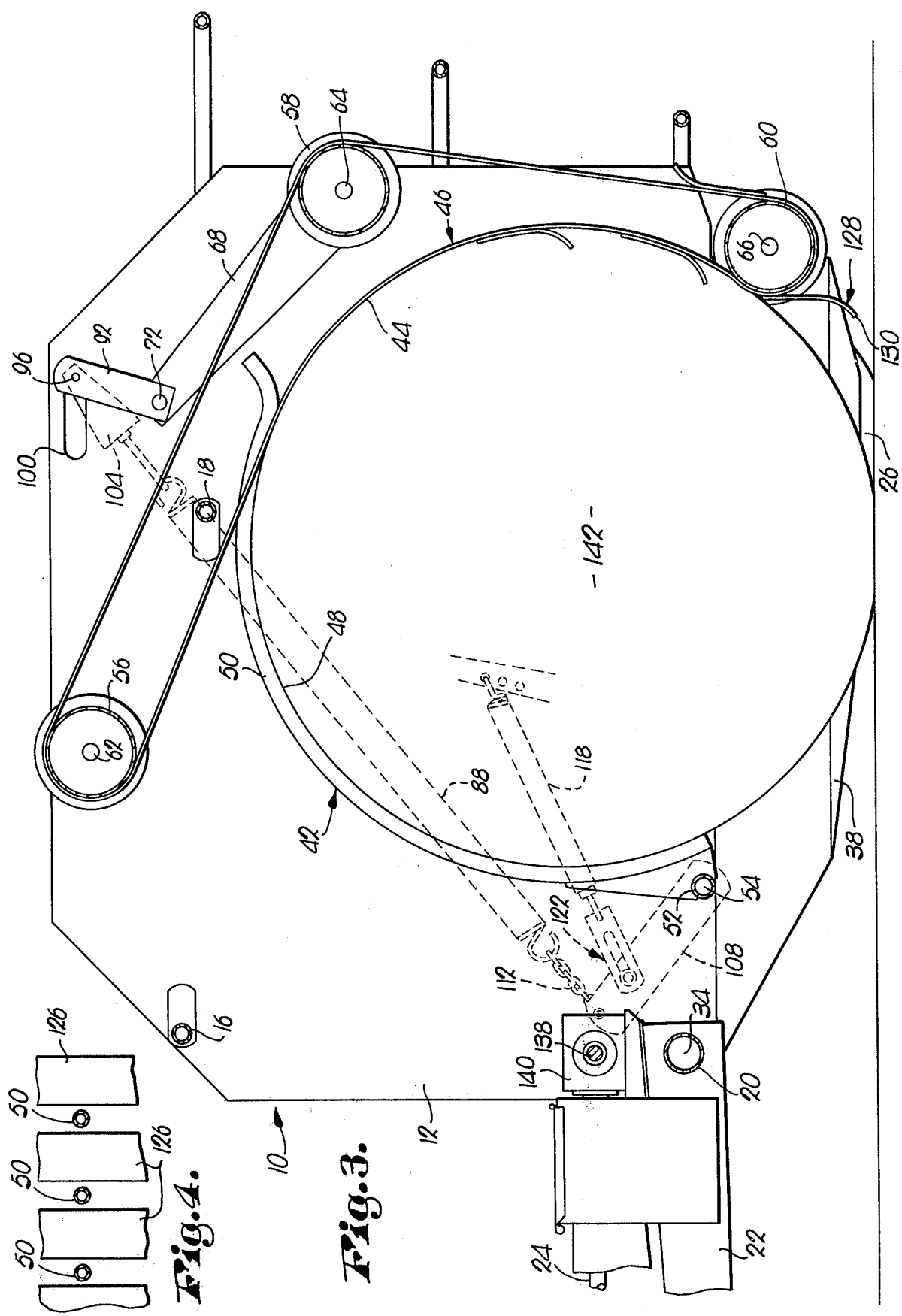

MACHINE FOR FORMING HIGH DENSITY ROUND BALES

This invention relates to the production of large, cylindrical bales of crop material which are commonly referred to by the industry and the involved public sector as large "round" bales. Accordingly, the latter terminology will be used throughout the description and claims which follow.

Producing a large round bale which meets the requirement of relatively high density and excellent weather-shedding characteristics depends upon a number of critical factors, not the least of which is the manner in which compactive forces are applied to the bale as it rolls or coils up material continuously added to the forming chamber. Such is true regardless of whether the machine involved is of the "ground roll" type wherein the bale is formed by pushing it along the ground in snowball fashion, or "off-the-ground roll" type wherein the bale is supported and formed in a chamber well above the ground. In both situations, if compactive forces are not properly applied to the bale as it grows in diameter, the result may be a misshapened or deformed bale that is, for example, oblong or egg-shaped rather than truly circular in crosssection. Such irregularity seriously affects the ease with which the forming process may be continued, the bale tied, and otherwise handled since it cannot roll smoothly. Moreover, its weather-shedding characteristrics are seriously impaired which leads to a problem of severe spoilage.

Accordingly, one important object of the present invention is to provide for the uniform application of equal compressive forces about the bale as it is formed, thereby obtaining a finished bale of high density and more truly circular cross-sectional configuration with the superior characteristics of quality and handling ease that inherently result from such features.

Pursuant to the foregoing, another important object of the present invention is to provide tension on opposed, compressive members in the forming chamber through a tensioning mechanism that is common to both of such members, thereby assuring that tensioning changes experienced by one of the members as a result of bale growth are concurrently, and to the same degree, experienced by the other member. Inasmuch as the compacting forces from the two opposed members remain equal to one another throughout the forming process, the bale has little opportunity to elongate in cross-section and instead remains almost perfectly circular.

An additional important object of the present invention is to achieve the foregoing without unduly complicating the baling machine or the manner in which the bale is formed, tied, and unloaded. In the drawings:

FIG. 3 is a view similar to FIG. 2 but showing the condition of components when the bale has reached full size; and FIG. 4 is a fragmentary, cross-sectional view taken substantially along line 4—4 of FIG. 2 illustrating the way in which rods of the front forming grid are interspersed between belts of the rear driving web.

Figure 1:
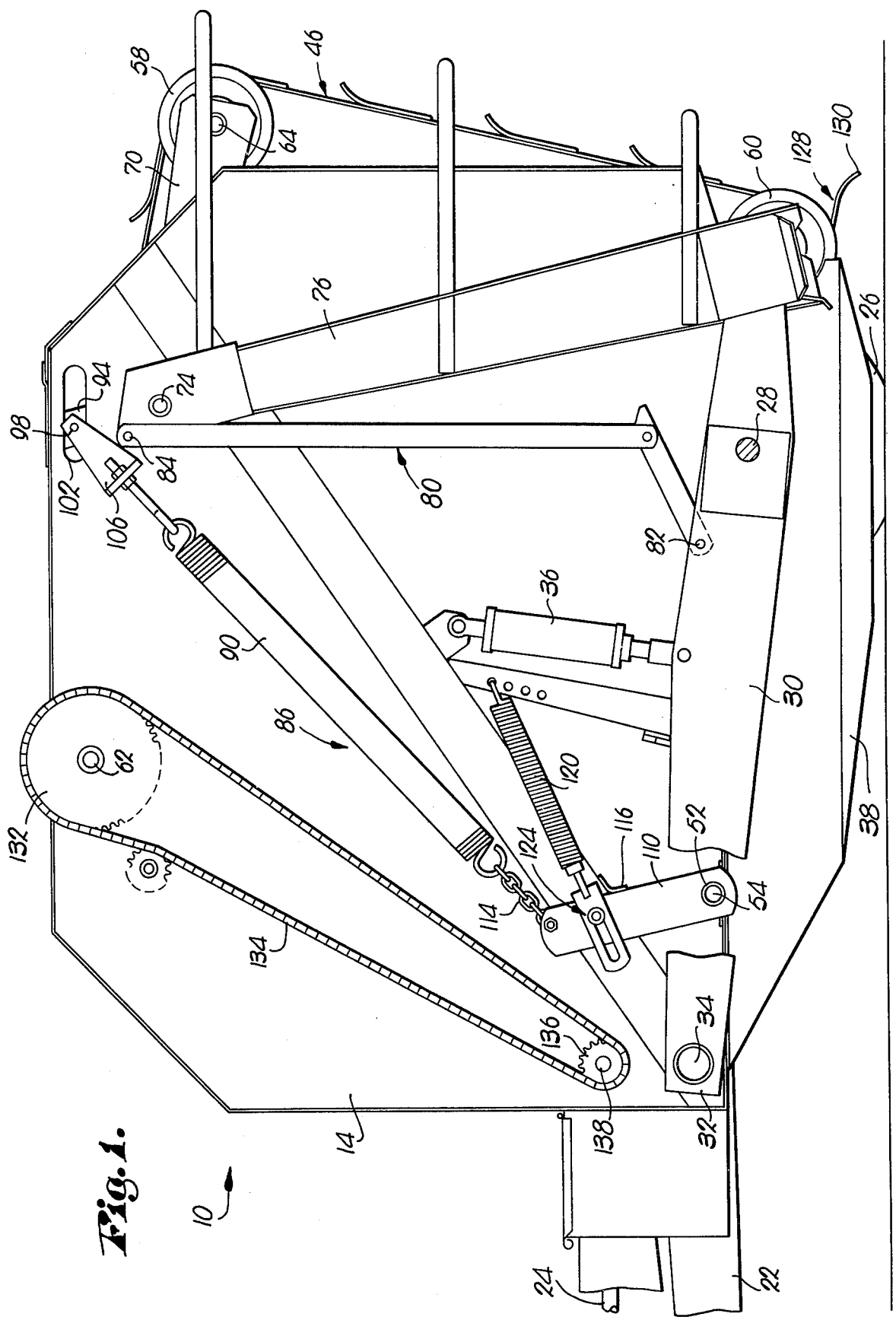
FIG. 1 is a fragmentary, side elevational view of a ground roll type baler embodying the principles of the present invention, the left ground wheel being removed for clarity.

The principles of the present invention have, for purposes of illustration only, been embodied within a ground roll type baler which forms the bale by coiling up crop material in snowball fashion. It will be recognized from the discussion which follows, however, that such principles may be applied to off-the-ground roll balers as well with equal success.

The baler, in its most basic respects, is a hollow box 10 whose boundaries are partially defined by a pair of laterally spaced-apart, fore-and-aft extending sidewalls 12 and 14. Sidewalls 12 and 14 are held in their fixed spaced relationship to one another by several crosspieces such as the small diameter pipes 16 and 18 in the upper portions of the box 10 and the single, large diameter tube 20 at the lower front corner of the box 10. A rigid tongue 22 extends forwardly from tube 20 for coupling box 10 with a towing vehicle (not shown), and the tongue 22 carries a fore-and-aft extending drive shaft 24 that may be coupled with the power-takeoff shaft of the vehicle to supply power to the driven components of box 10 yet to be described.

The box 10 is supported for over-the-ground travel by a pair of ground wheels, only one of which is illustrated and has been designated by the numeral 26. It will be readily understood that the wheels 26 are disposed on opposite sides of the box 10 outboard of the respective sidewalls 12 and 14, each wheel 26 being rotatably mounted on its own short axle 28 that projects laterally outwardly from a long, fore-and-aft extending beam 30, (one only of such beams being illustrated). The front ends 32 of the beams 30 are rotatably connected by any suitable means to the opposite ends of the large diameter tube 20 for swinging movement about the longitudinal axis 34 of the latter, and each beam 30 is provided with a hydraulic piston and cylinder assembly 36 approximately at its midpoint which connects it with the corresponding sidewall 12 or 14 to raise and lower box 10 relative to beams 30. In this way, the bottom 38 of box 10, which is fully open front-to-rear, may be positioned closer to or further above the ground as may be necessary or desirable simply by actuating assemblies 36.

Inside the box 10 and above bottom 38 is a forming chamber 40 defined along its opposite sides by the sidewalls 12, 14, along the front by an arcuate, retaining grid member 42, and along the back by the upwardly and forwardly inclined stretch 44 of an endless web member 46. The grid 42 is concavo-convex, having a concave lower surface 48 that is disposed to engage the bale during formation, such surface 48 having approximately the same radius as the bale when it is full size.

The grid 42 extends the full width of box 10 and includes a series of laterally spaced-apart, arcuate rods 50 which are supported in cantilever fashion by a crosspipe 52 journaled by sidewalls 12 and 14 adjacent the lower front corner of box 10. Grid 42 is thereby vertically swingable about the longitudinal axis 54 of crosspipe 52 and such swinging movement is normally between the lower limit illustrated in FIG. 2 and the upper limit illustrated in FIG. 3.

The web 46 is arranged in a triangular pattern with the stretch 44 forming one leg of such triangle. Maintaining web 46 in that pattern are three rotatable drums 56, 58 and 60 at the three corners of the triangle. The drum 56 spans the box 10 and is journaled by the sidewalls 12 and 14 adjacent the top of the box 10 such that drum 56 is rotatable about a fixed axis 62. Drums 58 and 60, on the other hand, are rotatable about movable axes 64 and 66 respectively. The drum 58 is rotatably carried by a pair of rearwardly extending, swingable arms 68 and 70, arm 68 being attached to the inside of sidewall 12 by a pivot 72 while the opposite arm 70 is pivotally attached to the inside of sidewall 14 by a pivot 74 in coaxial alignment with pivot 72. Similarly, the drum 60 is rotatably carried by a pair of long, generally upright arms 76 and 78 that are disposed on the outside of sidewalls 12 and 14. The upper end of arm 78 is attached to sidewall 12 at pivot 72, while the upper end of arm 76 is attached to the outside of sidewall 14 at pivot 74.

Swinging of the arms 76 and 78 is controlled by articulated linkage 80 on each side respectively of the box 10, only one of such linkages being illustrated. Using the linkage 80 on sidewall 14 as an example, the lowermost end of linkage 80 is pivotally connected to the beam 30 by a pivot 82 slightly behind the piston and cylinder assembly 36. The uppermost end of linkage 80 is pivotally connected to the arm 76 by a pivot 84 at a point slightly beyond pivot 74 such that when box 10 is raised by the piston and cylinder assemblies 36 relative to beam 30, the linkages 80 unbuckle and crank the arms 76, 78. and hence drum 60, counterclockwise about pivots 72, 74 until arms 76, 78 extend rearwardly in a substantially horizontal condition. This opens the rear of the box 10.

Figure 2:
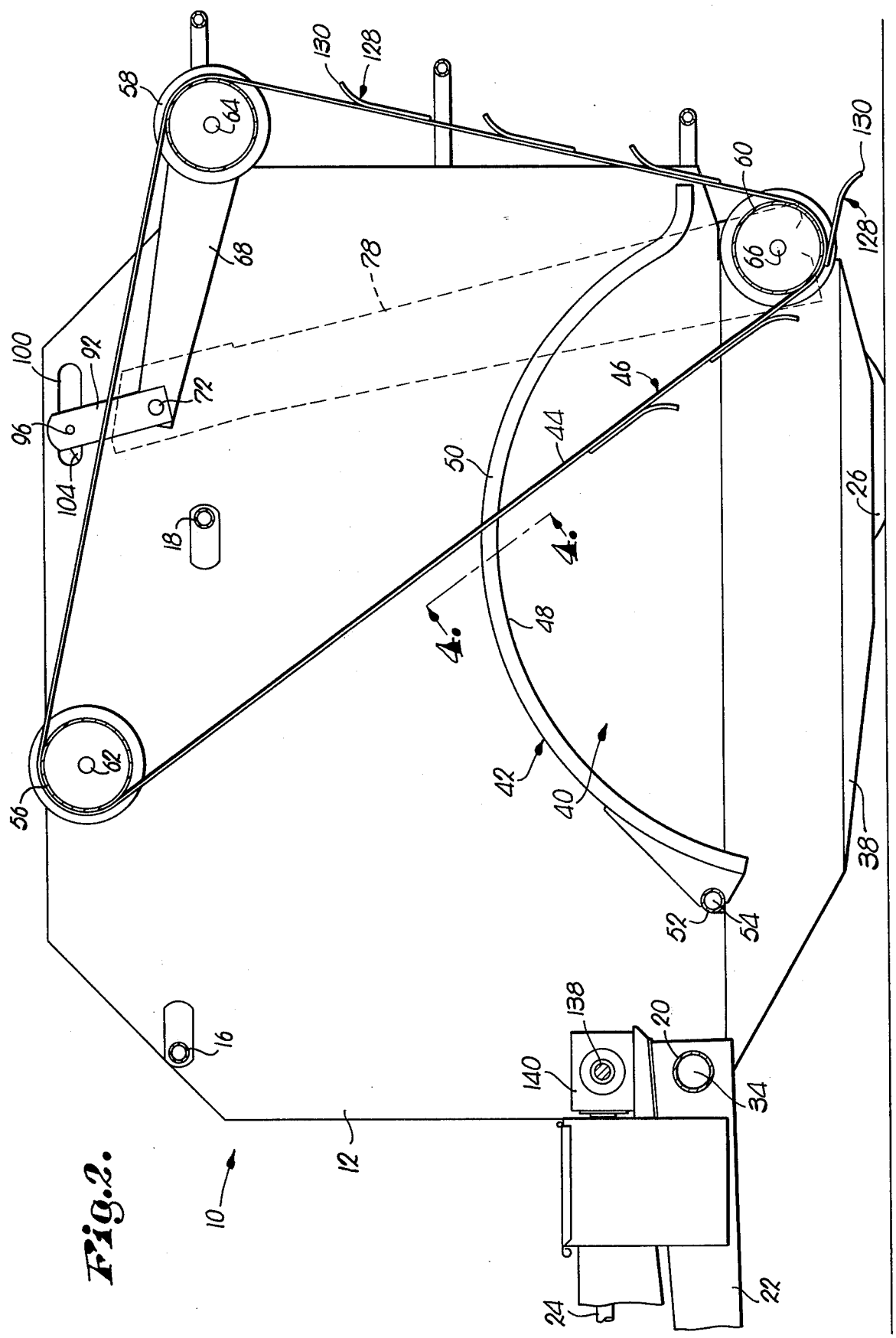
FIG. 2 is a fragmentary, vertical, cross-sectional view through the baler illustrating details of construction.

The drum 58 can swing between the two extreme positions illustrated in FIGS. 2 and 3, and this movement determines the amount of slack that is available for the stretch 44 between drums 56 and 60 as well as its tension. Because such activity on the part of stretch 44 must be so carefully coordinated with swinging movement of the grid 42 if a bale of desired shape and density is to be made, the arms 68, 70, and grid 42 share a common tensioning control mechanism denoted broadly by the numeral 86. Mechanism 86 includes a pair of long tension springs 88 and 90, one on each side respectively of the box 10, which are connected to the arms 68, 70 through cranks 92 and 94 respectively. Cranks 92 and 94 have outwardly projecting pins 96 and 98 that extend through horizontal slots 100 and 102 in sidewalls 12 and 14 respectively, such pins 96, 98 being in turn attached to adjustable units 104 and 106 which receive the upper ends of springs 88 and 90 respectively.

Similarly, the springs 88 and 90 are connected to the grid 42 through a pair of levers 108 and 110, such levers being fixed to opposite extremes of the crosspipe 52 projecting through sidewalls 12 and 14. Chains 112 and 114 on the upper ends of levers 108 and 110 receive the lower ends of the springs 88 and 90. Each lever 108, 110 may be provided with a limit for its clockwise swinging movement, such limit taking the form, for example, of a stop 116 against which the lever 110 bears in FIG. 1. In addition, the levers 108 and 110 may be provided with auxiliary spring assemblies 118 and 120 anchored to sidewalls 12 and 14 respectively for assisting in the tensioning of grid 42 when the latter approaches its fully raised position as illustrated in FIG. 3. The lost motion connections 122 and 124 between assemblies 118, 120 and levers 108, 110 assure that the additional tension from assemblies 118, 120 is only applied at such latter stages of movement of the grid 42.

The web 46 may take several different forms, but for purposes of illustration, it is shown as comprising a series of laterally spaced-apart belts 126 which are interspersed between the rods 50 along stretch 44 in the manner illustrated in FIG. 4. Each belt 126 may be provided with a series of lifting tines 128 mounted in such a way that their curved trailing ends 130 are caused to flip out as the belts 126 move around drum 60 in a generally clockwise direction so as to rake ground-lying materials forwardly and upwardly into the forming chamber 40. Power to drive belts 126 is provided by a sprocket 132 on sidewall 14 rigidly connected to the drum 56 for rotation therewith. Sprocket 132 is coupled with the input drive shaft 24 by an endless drive chain 134, a small sprocket 136, and a shaft 138 from sprocket 136 that makes a right angle connection with drive shaft 24 in a gearbox 140.

OPERATION

As the baler moves across a field with its components in the condition illustrated in FIGS. 1 and 2, the belts 126 are driven in a clockwise direction through the triangular pattern about drums 56, 58 and 60. Tines 128 flip out as they round drum 60 and aggressively rake windrowed crop material forwardly and upwardly into the forming chamber 40. As this action continues, the stretch 44, in conjunction with the grid 42, causes the material accumulating in chamber 40 to tumble forwardly and begin rolling into the core of a bale. Because of the tension applied against grid 42 and belts 126 by tensioning mechanism 86, the grid 42 and stretch 44 maintain their FIG. 2 relationship until such time as the rolling bale core becomes so dense that the addition of further crop material thereto can only be accomodated by expanding the chamber 40. Thus, the grid 42 starts to swing upwardly and forwardly, and the stretch 44 starts to yield upwardly and rearwardly.

Such separating movement of the grid 42 and stretch 44 is resisted by tensioning mechanism 86 throughout the remainder of bale growth, and it will be appreciated that throughout such growth the compressive force applied by grid 42 is substantially equal to that applied by the stretch 44. Note that as arms 68 and 70 swing clockwise from their raised positions, the cranks 92 and 94 pull against springs 88 and 90 so that, while stretch 44 is allowed to lengthen, the compactive force applied by stretch 44 is increased. Since springs 88 and 90 are also connected to levers 108 and 110 of grid 42, this action on the part of stretch 44 is immediately responded to by grid 42 with increased compressive force of its own, such increase in force being the same quantitatively as that experienced by stretch 44. Therefore, throughout the period of bale growth, until such time as the process is completed whereupon the bale takes the size and shape as illustrated by the bale 142 in FIG. 3, the grid 42 and belt stretch 44 apply balanced, equal forces against the front and rear of the rolling bale to properly shape and densify the latter. The bale 142 may then be tied by any suitable mechanism (not shown), followed by actuation of hydraulic assemblies 36 to raise drum 60 for bale discharge.

Merely tensioning the belts 126 and grid 42 through equal but separate tensioning devices has been found not to provide the desired results. In such instances, while the two members may start out under equal tensions, it is quite possible that one may yield more than the other as a result of engaging the bale at different locations and encountering the freshly picked-up material at different times. Therefore, the compressive loading against the bale becomes out of balance and the bale may be squeezed into an oblong or other irregular cross-sectional configuration with its inherent disadvantages and undesirable effect on the quality of the finished product.

Having thus described the invention, what is claimed as new and desired to be secured by Letters Patent is:

1. In a round bale forming machine:
   a pair of opposed bale-engaging members cooperating to at least partially define a chamber in which a bale is formed by rolling a progressively increasing supply of crop material between said members;
   means mounting said members for movement away from one another as the bale grows in size within said chamber to expand the latter for accomodating such growth; and
   mechanism common to both of said members for rendering the latter equally yieldably resistant to said movement and each responsive to force changes in the other.

2. In a round bale forming machine as claimed in claim 1, wherein said mechanism includes spring means interconnecting said members.

3. In a round bale forming machine as claimed in claim 2, wherein said spring means includes an elongated tension spring connected at one end to one of said members and at the opposite end to the other of said members.

4. In a round bale forming machine as claimed in claim 1, wherein one of said members includes an endless, flexible web having a bale-engaging stretch drivable in a direction to roll the bale within the chamber.

5. In a round bale forming machine as claimed in claim 4, wherein said mechanism includes means for lengthening said stretch to progressively increase the wrap of the stretch about the bale as the latter grows in size.

6. In a round bale forming machine as claimed in claim 5, wherein said stretch lengthening means includes a guide element entrained by said web and shiftable in a direction to lengthen said stretch.

7. In a round bale forming machine as claimed in claim 6, wherein said mechanism further includes spring means between the other member and said one element, said spring means biasing said element in the opposite of said stretch lengthening direction.

8. In a round bale forming machine as claimed in claim 6, wherein said web is arranged in a triangular pattern with said element at one corner of the triangle.

9. In a round bale forming machine as claimed in claim 4, wherein the other of said members includes a rigid, arcuate retainer having a concave, bale engaging surface.

10. In a round bale forming machine as claimed in claim 9, wherein said retainer is swingable for effecting said movement.

11. In a round bale forming machine as claimed in claim 10, wherein said web includes a plurality of laterally spaced-apart belts, said retainer comprising a grid having a plurality of laterally spaced-apart rods interspersed between said belts along said bale-engaging stretch of the web.

12. In a round bale forming machine as claimed in claim 11, wherein said mechanism includes swingable means for lengthening said stretch and a tension spring interconnecting said swingable means and the grid.

13. In a round bale forming machine as claimed in claim 1, wherein said chamber is open bottom for rolling the bale along the ground.

* * * * *